United States Patent [19]

Laipply

[11] Patent Number: 5,213,505

[45] Date of Patent: May 25, 1993

[54] VARIABLE COLOR MATRIX DEVICE

[76] Inventor: Thomas C. Laipply, 29 Lyman Cir., Shaker Heights, Ohio 44122

[21] Appl. No.: 720,185

[22] Filed: Jun. 24, 1991

[51] Int. Cl.⁵ ............................................. G09B 19/00
[52] U.S. Cl. ...................................... 434/96; 434/84; 434/98; 422/102; D24/226
[58] Field of Search ............... 434/81, 84, 96, 98, 434/103, 415, 417; 206/575, 81, 1.8; D24/223, 224, 226, 227, 229, 230; 422/102

[56] References Cited

U.S. PATENT DOCUMENTS

| | | | |
|---|---|---|---|
| D. 253,126 | 10/1979 | Baxter | D24/226 |
| 510,178 | 12/1893 | Konig . | |
| 887,342 | 5/1908 | McLane . | |
| 1,087,207 | 2/1914 | Austin . | |
| 1,484,795 | 2/1924 | Munsell | 434/98 X |
| 1,755,315 | 4/1930 | Chubb . | |
| 1,845,530 | 2/1932 | Tarallo . | |
| 1,890,004 | 12/1932 | Schubert | 434/84 |
| 1,950,649 | 3/1934 | Bauer | 434/84 |
| 2,149,363 | 3/1939 | Rivkin . | |
| 2,575,269 | 11/1951 | Hall . | |
| 2,984,488 | 5/1961 | Kirchner . | |
| 3,274,727 | 9/1966 | Zander . | |
| 3,447,256 | 6/1969 | Compton . | |
| 3,566,529 | 3/1971 | Kner et al. . | |
| 3,568,357 | 3/1971 | Lebensfeld . | |
| 3,932,141 | 1/1976 | Beall et al. | D24/226 X |
| 4,335,879 | 6/1982 | Wiskur | 434/81 X |
| 4,682,891 | 7/1987 | De Macario et al. | 422/102 X |
| 4,925,629 | 5/1990 | Schramm | 422/102 X |
| 4,956,150 | 9/1990 | Henry | D24/226 X |
| 4,986,756 | 1/1991 | Yamaguchi | 434/96 |

FOREIGN PATENT DOCUMENTS

| | | | |
|---|---|---|---|
| 985673 | 2/1955 | France . | |
| 220516 | 7/1942 | Switzerland | 434/96 |
| 166942 | 7/1921 | United Kingdom | 434/96 |
| 269949 | 4/1927 | United Kingdom . | |
| 435322 | 3/1934 | United Kingdom . | |

*Primary Examiner*—Richard J. Apley
*Assistant Examiner*—Karen A. Jalbert
*Attorney, Agent, or Firm*—D. Peter Hochberg; Mark Kusner

[57] ABSTRACT

A device for creating a colored design including transparent light-transmitting receiving wells for receiving and holding colorants, the wells being disposed in a grid-like plate adapted to hold the wells. The device also including a colorant material transfer device for transferring colorant material to the receiving wells. The colorant materials may be liquid or solid materials.

6 Claims, 3 Drawing Sheets

VARIABLE COLOR MATRIX DEVICE

TECHNICAL FIELD

This invention relates to a device useful for generating colored patterns. More particularly, this invention relates to a device that can be used to facilitate learning processes through the associate use of acquired knowledge to prepare colored designs. Specifically, this invention relates to a device formed from a plurality of cup-like colorant-receiving wells positioned adjacent to each other in a honeycombed grid configuration which are capable of holding colored liquids or colored beads placed therein, to form a desired pattern.

BACKGROUND OF THE INVENTION

The creation of pleasing designs has fascinated both young and old alike from the time the ability to make them was acquired. Fanciful designs have, for example, been incorporated in pottery, rugs, architectural features and many other products fashioned by human ingenuity since ancient times. Apart from their inclusion in utilitarian artifacts, however, the origination of interesting designs is frequently undertaken simply for the pleasure of their creation. Thus, kaleidoscopes have provided hours of enjoyment to users for generations. The cutting of multi-folded paper into interconnected geometric patterns is another illustration of the preparation of designs for their own sake, as are sand paintings, similar to those employed by the Navaho Indians in their healing ceremonies.

Among the many commercial devices that have been devised to indulge this widespread interest in design creativity may be mentioned the mosaic "plug-in" toy which is the subject of U.S. Pat. No. 3,566,529. The toy takes the form of holes disposed in a grid pattern in a substrate. "Mosaic" plates having plug-in members extending therefrom are designed to be received in the holes, thereby permitting their temporary attachment to the substrate as desired to form the intended design.

Another mosaic toy device is that shown in U.S. Pat. No. 510,178 involving a substrate plate containing holes arranged in a grid pattern that permits small stone chips whose underside is shaped to conform to the surface of the holes to be placed therein. By the selective placement of different colored stones, a design or picture can be formed therewith.

A similar device is that taught by U.S. Pat. No. 3,569,357 which involves a peg board mounted over a light source into which colored plastic pegs are inserted. A perforated design card may be placed on the board and used as a guide to form a desired design or picture.

Still another device, U.S. Pat. No. 2,149,363, illustrates hinged, back-to-back panels possessing aligned openings therein. Sheets of stencil material are placed between the panels and holes punched in the sheets to form a desired design, using punching tools passed through the aligned openings. Alternatively, colored pins may be inserted in the openings through a pin-retaining resilient fabric stretched thereover to produce a design.

While all of the devices described permit designs and pictures to be created therewith, they have a number of inherent disadvantages. For example, the design color combinations possible with such boards are restricted to the available colors of the insertable pieces. Furthermore, in the case of some of the devices described, the repeated reinsertion of the design-forming pieces into the boards gradually irreversibly enlarges the size of the holes therein, impairing their piece-retention characteristics. This makes the board with a contained design thereon difficult to manipulate without risk of unintended displacement of the pieces and resultant damage to the design.

In addition, since the designs are dependent on the use of the unique pieces associated therewith, the loss of such pieces impairs or renders impossible the creation of the designs for which the boards were intended. Also in most instances, the designs produced with the devices are ephemeral, and their form cannot easily be fixed independent of the board on which it was created.

BRIEF DESCRIPTION OF THE INVENTION

In view of the preceding, therefore, it is a first aspect of this invention to provide a device with which desired pictures and designs can be prepared.

A second aspect of this invention is to provide a device in which, in a preferred embodiment, colored designs can be prepared therefrom in an infinite number of colors.

An additional aspect of this invention is to provide a device for preparing illuminated colored designs which can be preserved for extended periods of time.

Another aspect of this invention is to provide a device on which the design can be prepared, and thereafter transferred to another medium on which it can be permanently fixed.

A further aspect of this invention relates to a device for preparing designs thereon which can be used for instructional purposes.

Yet an additional aspect of this invention is to provide a device in which in a preferred embodiment allows the preparation of designs therewith without the use of insertable pieces susceptible to loss.

An added aspect of this invention is to provide a device which permits designs to be prepared therewith from materials that are readily replenished.

Still another aspect of this invention is to provide a device which is relatively immune to wear, from which designs can be prepared.

The foregoing and additional aspects of the invention are provided by a device for creating colored designs including in combination: a honeycombed plate comprising a plurality of adjacent, light-transmitting, colorant-receiving wells having closed lower ends and open upper ends, the wells being spaced from each other in a grid-like pattern on the plate, and transparent colorant material being adapted to be entirely received in, and held by the wells.

The foregoing and other aspects of this invention are prepared by a process for creating colored designs comprising placing light-transmitting colorant materials in a desired arrangement entirely within colorant-receiving wells in a honeycomb plate which includes a plurality of adjacent ones of the wells, the wells being transparent and having closed lower ends, and open upper ends, and being spaced from each other in a grid-like pattern on the plate.

BRIEF DESCRIPTION OF THE DRAWINGS

The invention will be better understood when reference is had to the following drawings in which like numbers refer to like parts, and in which.

DETAILED DESCRIPTION OF THE INVENTION

Figure 1:
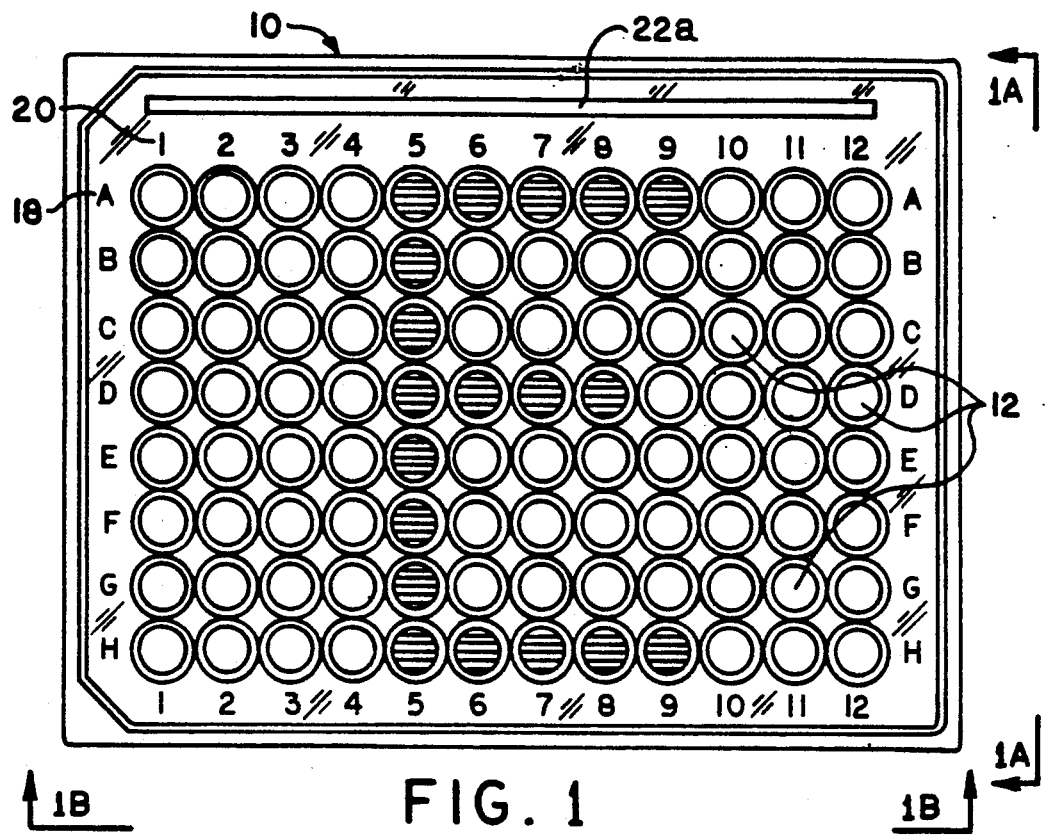
FIG. 1 is a plan view of a well plate of the invention containing colorant-receiving wells therein.

FIG. 1 is a plan view of a well plate of the invention containing colorant-receiving wells therein. The Figure shows the well plate, generally 10, consisting of a plurality of colorant-receiving wells 12 disposed in the plate in a grid-like pattern. Coordinate identification, letters and numbers, 18 and 20, respectively, are disposed along the edges of the plate for the purpose of coordinate identification. While a rectangularly shaped tray is illustrated, the tray may also be fabricated in a round, square, triangular or other geometric configuration.

The well plate is used in preparing desired designs by placing colorant material, either liquids or solids, as described in more detail hereinafter, entirely within the colorant-receiving wells 12. Original designs may be readily prepared in such manner; however, in a form particularly suitable for juveniles, colored designs can be furnished for copying. In addition, directions may be provided for playing "mystery games" in which an unknown design is gradually developed by following instructions which call for filling particular receiving wells with colorants, the proper receiving wells being stipulated by reference to identifying coordinates on the well plate.

The device can also be used for instructional purposes. In this regard, an arithmetic operation may be specified, the correct answer to which identifies a coordinate whose receiving well is to be filled with a particular colorant. After a series of such operations has been solved and the corresponding receiving wells filled with colorants, the player is rewarded by development of a previously unknown design. The device can be used as a teaching device for number theory, even numbers, odd numbers or the like. A similar game may be played by assigning particular colorants to individual letters of a word, resulting in the disclosure of a previously unknown design when the receiving wells corresponding to a series of words have been filled. The process of filling the wells helps to reinforce the spelling of the word in the mind of the player.

Figure 1B:
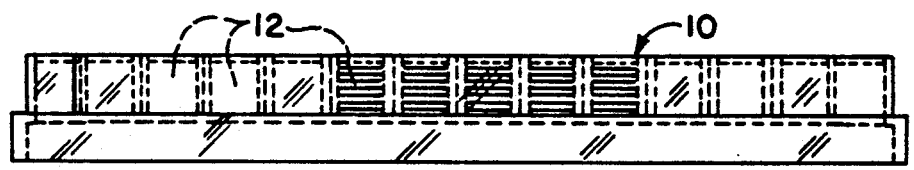
FIG. 1B is a front elevation of the well plate of FIG. 1.
Figure 1A:
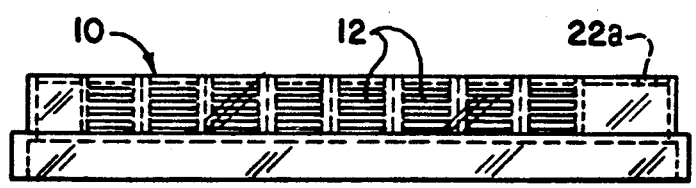
FIG. 1A is a side elevation of the well plate of FIG. 1.

FIG. 1A is a side elevation of the well plate 10 showing the disposition of the colorant-receiving wells 12, therein. Also shown is a well plate hook edge groove 22a, whose function is explained more fully in connection with FIG. 2.

The cross-section of the colorant-receiving wells 12 may be varied as desired. It can, for instance, be circular, square, triangular, or have some other geometric cross-section. The wells in a device can be of different size or shape, and can be arranged to have different appearances depending on the orientation at which they are viewed.

The receiving wells will desirably be transparent, as will be the balance of the well plate in a preferred embodiment. It is also of advantage to enhance the brightness of the design by the use of an appropriate background beneath the well plate 10, for example, reflective paper, a mirror, a light source, or the like.

FIG. 1B is a front elevation of the well plate 10 of FIG. 1 showing the colorant-receiving wells 12.

The diameter of the receiving wells, which may vary within relatively broad limits, is typically from about ¼ to ⅜ inch in diameter. Where solid colorants are to be used, for example, of the kind shown in connection with FIG. 6, wider diameters are desirable to permit ready access of the tips of the forceps used to retrieve the colorant beads, as will be later described. Where, however, the colorant is to be a colored liquid, the use of narrower diameters is preferable since the surface tension of the more constricted wells, minimizes any tendency of the colorants to spill therefrom.

Figure 1C:
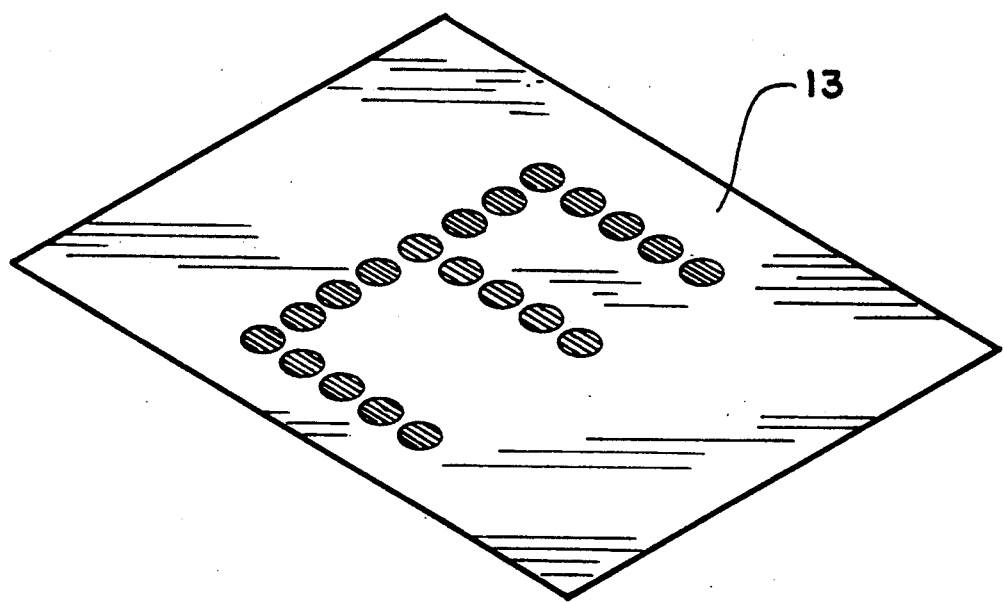
FIG. 1C is a perspective of a sheet of colorant-receiving material having a design.

While a desired design, for instance the "capital E" shown in connection with FIG. 1, may be created for viewing simply in the well plate, in instances where liquid colorants are used, the designs can be transferred to a separate medium, for instance, to a sheet of paper, by disposing the paper over the well plate and its contained receiving wells and inverting the plate so that the paper is contacted by the colorant liquid. Following reinversion, the paper is removed, leaving the colored design on its surface. A sheet of such paper, having contacted the device in FIG. 1, is shown by the number 13 in FIG. 1C, with the letter "E" having been transferred thereto.

Figure 2A:
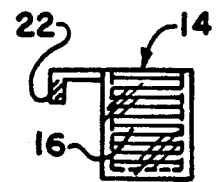
FIG. 2A is a side elevation of the colorant supply tray of FIG. 2.
Figure 2:
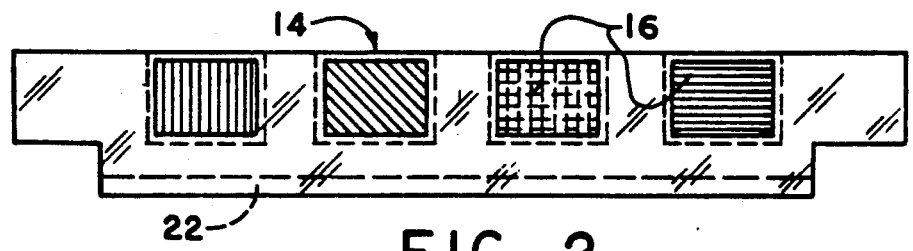
FIG. 2 is a plan view of a colorant supply tray of the invention.

FIG. 2 is a plan view of the colorant supply tray of the invention. As shown, the colorant supply tray 14 is provided with a number of colorant supply wells 16 in which the colorant materials are kept prior to their transfer to the receiving wells 12. The colorant supply tray 14 has a tray attachment hook edge 22, better seen in FIG. 2A for the purpose of temporarily connecting the colorant supply tray to the well plate 10.

FIG. 2A is a side elevation of the colorant supply tray of FIG. 2. The colorant supply tray 14 has a tray attachment hook edge 22 connected thereto which cooperates with the plate hook edge groove 22a of the well plate. While the colorant supply tray 14 can be positioned at a distance from the well plate 10, it is frequently convenient to have the well plate in close association with the colorant supply tray, and a temporary attachment can be effected between the two by disposing the tray attachment hook edge 22 of the colorant supply tray into corresponding plate hook edge groove 22a.

Figure 3:
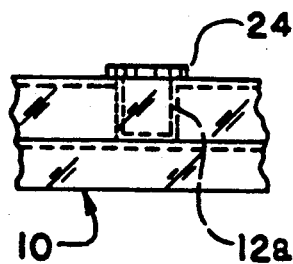
FIG. 3 is a partial side elevation of a well plate with a removable colorant-receiving well disposed therein.

FIG. 3 is a partial side elevation of a well plate of the invention with a removable colorant-receiving well disposed therein. In this connection, the well plate 10 can be molded, for example, from plastic, glass, or some other transparent material, or the well plate and the colorant-receiving wells may be separately formed. The Figure shows the well plate 10 with a separable colorant-receiving well 12a having a retaining flange 24 attached to the top thereof. In the case of the Figure, the colorant-receiving wells 12a are formed separately from the well plate 10. When so fabricated, the colorant-receiving wells are formed from a transparent material, while the well plate 10 may be formed from either a transparent or an opaque material.

Figure 4:
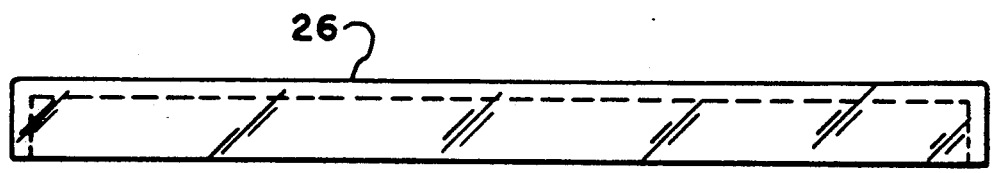
FIG. 4 is a front elevation of a well plate cover of the invention.

FIG. 4 is a side elevation of a well cover plate of the invention. While use of the cover plate 26 is optional, it is of advantage in many instances since it tends to help retain the colorant material in the receiving wells, for example, when the well plate is accidentally jarred, or otherwise manipulated, for instance, to facilitate its placement adjacent to illuminating means, such as a light or window.

While a cover helps to assure retention of the coloring materials within the colorant-receiving wells, resort may also be had to receiving well caps which may be placed over the top of the colorant-receiving wells to achieve the same purpose.

An advantage of providing the removable colorant-receiving wells is that they can be removed and repositioned in the well plate to create new designs, without any need to transfer the contents of the wells to still other wells to create a new design.

In either the case of the device shown in FIG. 1 in which the colorant-receiving wells form an integral part of the well plate 10, or the removable receiving wells 12a of FIG. 3, liquid coloring material may be readily removed from the receiving wells merely by rinsing the wells out with water.

Figure 5:
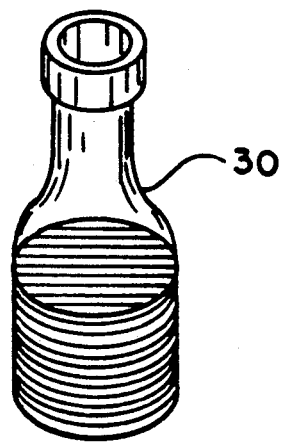
FIG. 5 is an isometric view of a colorant container with liquid colorant therein.

FIG. 5 is an isometric view of a colorant container 30 with liquid colorant therein. A kit of the type described in connection with the invention will advantageously include at least the three primary colors, i.e., red, yellow and blue, although additional colors may be included if desired. Where only the primary colors are included, an infinite number of other colors can be derived therefrom by color blending.

Figure 6:
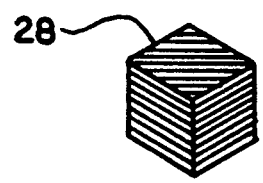
FIG. 6 is an isometric view of a colorant bead of the invention.

FIG. 6 is an isometric view of a colorant bead of the invention. While the use of liquid colorants, for instance, aqueous food colors, has particular advantages, solid colorants in the form of colored beads may also be employed. When the designs are made from colored beads, the beads may be spherical or multi-faceted, the latter facilitating easier gripping by transfer forceps, such as the transfer forceps 34 of FIG. 8.

The colored beads will advantageously be transparent, and although a single bead positioned in a colorant-receiving well will provide a design medium, design colors other than those incorporated in the colors of the beads provided with the kits may be achieved by placing different colored beads in the same receiving wells, the resulting color being a combination of the colors of such beads. Color enhancement, i.e., darkening, can also be achieved by placing more than one bead of the same color in a particular colorant-receiving well.

Figure 7:
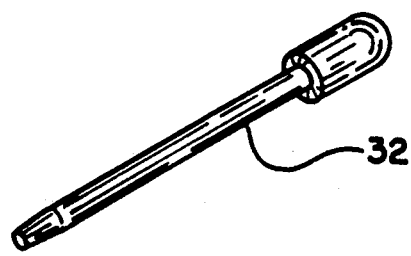
FIG. 7 is an isometric view of a liquid colorant suction transfer device of the invention.

FIG. 7 is an isometric view of a liquid colorant suction transfer device 32. The suction device may consist of a pipette, an eye dropper, a syringe, or some other equivalent suction device. The suction device is employed, for example, in transferring liquid colorant materials back and forth between the colorant supply wells and the colorant-receiving wells, and between individual receiving wells.

Figure 8:
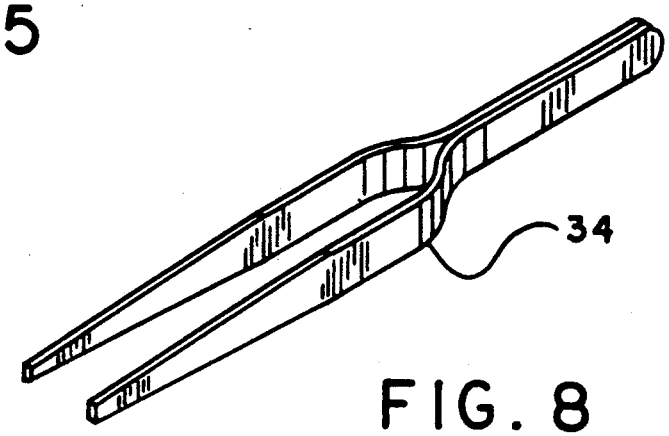
FIG. 8 is an isometric view of a colorant bead transfer forceps of the invention.

FIG. 8 is an isometric view of a colorant bead transfer forceps of the invention 34, employed in transferring coloring beads back and forth between the receiving wells, and between the receiving wells and the colorant supply wells.

While a typical kit may contain more or less components, it typically will comprise a well plate with included receiving wells; bottles of colorant material; a suction device; a bead transfer forceps, where colored beads are also included; and advantageously, a well plate cover or caps. A colorant supply tray may also be included, which may or may not be temporarily attachable to the well plate. Desirably, a booklet of instructions, designs and the like will also form part of the kit, and the kit components will preferably be enclosed in a suitable container.

The well plates described above are shown having flat surfaces from which the wells extend. However, the flat surface is "generally" flat in that it can have portions at different elevations, the surface can be canted or curved, etc., so long as the colorant in the wells remains in the wells. Also, the well plates can be either rigid or flexible, the latter being safe for very young children.

The invention has been described with particular emphasis on the preferred embodiments, but variations and modifications within the spirit and scope of the invention may occur to those skilled in the art to which the invention pertains.

What is claimed is:

1. A device for creating a colored design including in combination:

a honeycombed plate comprising a generally flat upper surface from which descend a plurality of adjacent transparent colorant-receiving wells having open upper ends at said upper surface and closed lower ends, said walls being spaced from each other in a grid-like pattern on said plate, light-transmitting colored fluids adapted to being selectively received in and held by the respective wells to form a light-transmitting design or pattern, said plate including an attachable colorant supply tray for receiving said light-transmitting colored fluids and having a tray attachment hook edge for attaching said colorant supply tray to said plate, and means for transferring said light-transmitting colored fluids from said colorant supply tray to said colorant-receiving wells to form said light-transmitting geometric design or pattern.

2. A device according to claim 1 wherein said plate includes a plate hook edge groove for engaging said tray attachment hook edge.

3. A process for creating predetermined light-transmitting geometric designs or patterns utilizing a supply of a plurality of differently colored light transmitting fluids, said process comprising selectively placing light-transmitting colored fluids, chosen from said supply, within a transparent design tray having a plurality of adjacent wells, said wells having closed lower ends and open upper ends, and said wells being spaced from each other in a grid-like pattern in said transparent design tray, to create said predetermined designs or patterns.

4. The invention according to claim 3 wherein the process includes following instructions for developing a mystery design, said process comprising placing the colored fluids in the wells pursuant to the instructions to develop the design.

5. The invention according to claim 3 wherein the process includes following instructions directed to mathematical or word problems, said process comprises placing the colored fluids in the wells pursuant to the instructions to perform the mathematical or word problem.

6. The invention according to claim 3 and further including the step of placing the light-transmitting colored fluids in the wells by means of a suction device.

* * * * *